UNITED STATES PATENT OFFICE 2,333,911

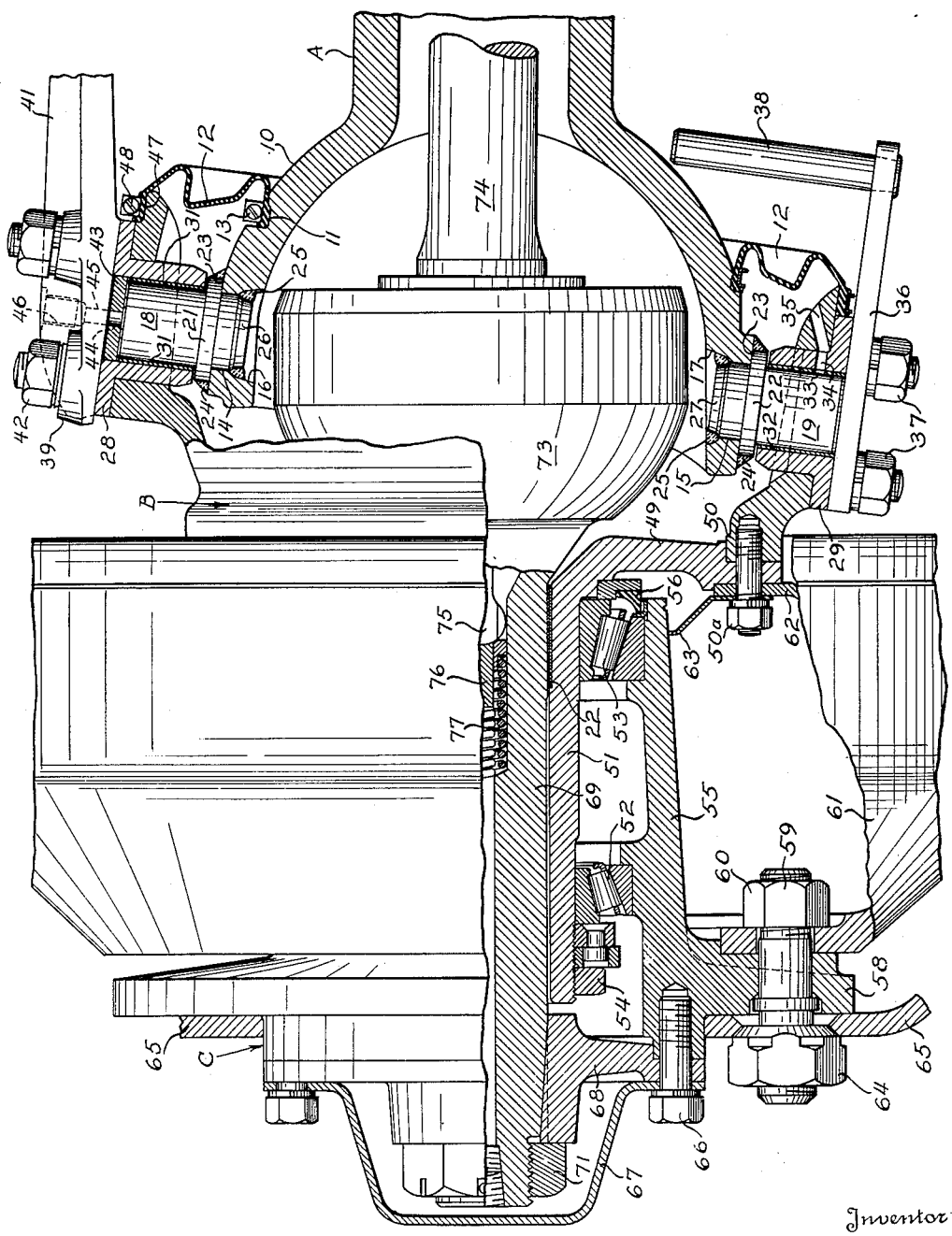

STEERING DRIVE AXLE

Herbert W. Alden, Detroit, Mich., assignor to The Timken-Detroit Axle Company, Detroit, Mich., a corporation of Ohio Application February 6, 1942, Serial No. 429,829

6 Claims. (Cl. 280—96.1)

The present invention relates to drive axles of the steering drive type, having dirigible wheels for steering purposes.

In my prior Patent No. 2,075,563, granted March 30, 1937, I have disclosed a steering drive axle embodying a spindle mounted for steering movements on a stationary axle housing by means of trunnions pressed into openings in the stationary housing.

The axle disclosed in said Patent No. 2,075,563 had certain substantial advantages over the prior art, but the trunnions under certain classes of heavy duty service tended to work loose, often resulting in failure of the trunnion or housing adjacent the openings. Also, the needle bearings used in that axle were expensive and difficult to properly lubricate and service; the use of a trunnion thrust plate at both top and bottom further complicated and increased the cost of the axle; and the straight spline connection between the stub shaft and hub did not provide all the rigidity desired.

Accordingly, the major object of this invention is to improve the axle construction shown in said prior patent and to reduce its size, weight and cost substantially, without sacrificing the advantages of the invention disclosed in said patent. These improvements I accomplish primarily.

a. By providing an improved mounting for the trunnions in the stationary housing, which materially increases the strength of the trunnions, and at the same time greatly enhances resistance of the trunnions against working loose from the housing during operation, and yet does not increase the cost or weight appreciably;

b. By providing simple sleeve type bearings and means for insuring adequate lubrication of them at all times, together with simplified means for absorbing thrusts developed during operation; and, c. By providing a tightly fitting spline assembly at the outer end of the stub shaft and sufficient clearance in the stub shaft bushing to permit free steering movements without developing undesirable stresses in the stub shaft or other parts, irrespective of whether the oscillating axis of the universal joint and the trunnion axes accurately intersect each other.

Certain of the aforementioned improvements are disclosed in my co-pending application, Serial No. 331,017, filed April 22, 1940, now abandoned, of which this application is a continuation-in-part.

Further objects will become apparent as the specification proceeds in conjunction with the annexed drawing, and from the appended claims.

In the drawing, the single figure is a longitudinally sectional view through a steer drive axle embodying my invention, showing certain parts in elevation to simplify the disclosure.

With continued reference to the drawing, the axle is broadly made up of a stationary axle housing section A, which is connected by springs to the vehicle, in well known manner. A movable housing or a spindle B is journalled for steering movements upon the housing section A and a hub assembly C is journalled on the spindle in a manner to be hereinafter pointed out.

Housing A terminates in a bell-shaped portion 10, having a circumferential groove 11 receiving the inner edge of a flexible grease sealing boot 12. The boot is held in place by a clamp ring assembly 13. The spindle is rockably mounted upon the large end of the housing by a novel trunnion assembly that will now be described.

A pair of axially aligned cylindrical openings 14 and 15 are provided in the housing and they merge into cup-shaped recesses 16 and 17, respectively, the latter opening onto the inner surface of the housing. A pair of trunnions 18 and 19, having flanges 21 and 22, respectively, are preferably pressed into the openings, with their flanges seating snugly against flat surfaces 23 on the exterior of the housing. Although flanges 21 and 22 are preferably integral with the trunnions, the welding operations to be now described rigidly unite the flange and trunnion with the housing in such manner that a separate flange, in the form of a washer, may be employed if desired.

It has been found that by rigidly uniting both the flange and the trunnion with the housing in the manner to be now described, the trunnion failures that have heretofore occasionally occurred are totally eliminated, the trunnions remaining in proper aligned relationship and tight in their sockets throughout the life of the axle.

To this end, an annular weld 24 of triangular section is made around the periphery of flanges 21 and 22, and securely uniting it with, or bonding it to flat surfaces 23 of the housing. The inner end of the trunnion is rigidly secured in place by an annular weld 25 in recesses 16 and 17, the inner ends of the trunnions preferably being provided with beveled surfaces 26 and 27, respectively, providing for a weld of increased body and increased bonding area. It is to be understood that any suitable welding method may be employed, so long as it results in an intimate bond of the welding material with both the trunnion and the housing.

The trunnions are accordingly rigidly held in their openings at all times and also, by reason of the welds being spaced axially, and the outer weld being at the periphery of the flange, the trunnions themselves are given additional strength.

The spindle of the movable housing is journalled on the trunnions assembly by a novel bearing assembly providing maximum strength with minimum weight, adequately taking care of the thrust forces developed during operation and also affording proper lubrication of the working parts at all times.

Fitting in aligned apertures in movable housing B are top and bottom bearing members 28 and 29, respectively, carrying bushings 31 and 32 journalled on the trunnions. Lower bushing 32 is provided with a lubricant port 33 communicating with passages 34 and 35 in member 29 and the spindle, respectively, for insuring adequate lubrication of the lower trunnion. Boot 12 catches lubricant draining to the bottom of the assembly and provides a pool adjacent passage 35, constantly supplying lubricant thereto.

The lower trunnion is disposed in direct thrust-transmitting engagement with a cap member 36 secured to the spindle by stud and nut assemblies 37. Bottom cap 36 also carries a pair of guard posts 38 for preventing objects in the road from damaging boot 12.

A top cap member 39, having an integral steering arm portion 41, is secured to the spindle by stud and nut assemblies 42, and interposed between its inner surface and the end of trunnion 18 is an accurately ground thrust plate or washer 43, having a central aperture 44, transmitting lubricant from a passage 45 in the cap to the bearing faces. Passage 45 terminates its upper end in a threaded opening 46, which is normally plugged, but may be removed and a lubricant gun applied in well-known manner to force lubricant to the interior.

I have found that by employing a thrust plate at the top trunnion, and allowing the bottom trunnion to cooperate directly with the lower cap member, and providing a total endwise play or clearance between thrust plate 43 and the upper trunnion, and cap 36 and the lower trunnion, of from two to ten thousandths of an inch, adequate lubrication of the parts is insured at all times, reducing wear to a minimum and at the same time the parts are restricted to accurate rocking movement about the axis of the trunnions with sufficient restriction upon end play to insure maintenance of proper steering geometry at all times.

The outer edge of boot 12 seats in a groove 47 in the spindle or movable housing and is retained by means of a clamp ring assembly 48. Since the boot, together with guard posts 38, are disclosed and claimed in a co-pending application, they will not be further described.

As seen in the lower part of the figure, the movable housing is made up of a spindle section 49, and a housing section 50, secured together by stud and nut assemblies 50a. Rotatably mounted on a sleeve portion 51 of spindle 49, by means of anti-friction bearings 52 and 53, held in place by a lock nut assembly 54, is a hub member 55, a seal 56 being provided to prevent lubricant leakage from the hub. The seal assembly is disclosed and claimed in a co-pending application of Lawrence R. Buckendale and will not be further described.

Secured to a flange 58 on the hub, by means of studs 59 and nuts 60, is a brake drum 61. A brake foundation member 62 and a grease deflector 63 are stationarily mounted on the spindle by the stud and nut assemblies 50a, which hold the movable housing sections together. Nuts 64 threaded on studs 59 demountably attach a wheel 65 to the hub flange.

Secured to the end of the hub, by means of cap screws 66, is a hub cap 67, and an internally tapered splined disc or spider 68. The latter is tightly held on the correspondingly tapered splined end of a stub shaft 69 by means of a nut 71. The tapered splined connection between the hub and stub shaft is highly advantageous, and is made feasible by the enlarged clearance between the stub shaft and bushing now to be described.

The inner end of the stub shaft is journalled in a thin, steel-backed bushing 72, mounted in spindle 49 and preferably having a radial clearance of approximately twenty-five thousandths of an inch for a purpose that will presently appear. The stub shaft is also provided with an enlarged bowl portion 73, housing a universal joint, preferably of the constant velocity type, which is coupled to a drive axle 74, the latter being driven by a ring gear, pinion and differential, (not shown) in well-known manner.

During the assembly the parts are so adjusted that the oscillating axis of the universal joint substantially exactly intersects the axis of the trunnions, so that in response to steering movement of the spindle there will be no tendency of the axle and stub shaft assembly to move either out or in.

I have found that it is not always possible to secure this exact relationship during initial assembly, and that moreover the axes often become misaligned after the axle has been in use for some time, with the result that when the stub shaft is rigidly secured to the hub by means of a tightly fitting tapered spline assembly, and the wheels are turned into full cramp position, a bending action will develop between the stub shaft and the bushing, unless sufficient play is present to allow slight radial displacement. I have found that by providing approximately twenty-five thousandths of an inch clearance between bushing 72 and the stub shaft, it is possible to employ the highly desirable type of tightly fitting tapered spline connection at the outer end of the stub shaft, and yet at the same time allowing the spindle to be freely turned into full cramp position, in either direction, without setting up undesirable bending tendencies in the stub shaft adjacent the bushing. Also, the thin, steel-backed bushing is better able to withstand any vibrating movements of the stub shaft during steering.

The universal joint may be of any suitable type. The "Rzeppa" type constant velocity joint is shown, having a race-aligning plunger 75 backed up by a spring pressed member 76 working in a bore 77 in the stub shaft, in well-known manner.

From the foregoing detailed disclosure it is apparent that there is provided an axle having extremely rugged trunnion assembly, deriving its strength principally from the novel welding assembly and without increasing the size or weight of the parts; the thrust-transmitting and the lubrication system for the trunnions are also of improved design, adequately absorbing thrust forces during operation and constantly insuring proper lubrication of the working parts; and the axle also provides a tightly fitting tapered spline connection between the stub shaft and hub, and yet by incorporating proper clearances between the bushing and the inner end of the stub shaft, free steering movement of the parts into full cramp position in either direction may be effected irrespective of whether the oscillating axis of the universal joint is exactly aligned with the trunnion axes, and without setting up undesirable bending forces in any of the parts.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an axle construction, an elongated housing having an enlarged end provided with a substantially radially directed opening; a trunnion assembly fitting in said opening and projecting outwardly thereof; a weld securing the inner end of said trunnion assembly to said enlarged portion of said housing; and a second weld securing the trunnion assembly to the outer face of said housing.

2. The axle construction defined in claim 1, wherein said first-named weld is located in a recess in the inner wall of said housing and is bonded to the walls thereof.

3. The axle construction defined in claim 1, wherein said trunnion assembly is flanged adjacent the outer face of said housing and said second weld is bonded thereto.

4. The axle construction defined in claim 1, wherein said trunnion assembly comprises a cylindrical journal portion located outwardly of said housing and an integrally formed flange tightly abutting the outer face of said housing and is secured thereto by said second weld.

5. In a steer drive axle, a housing having an enlarged end portion provided with an upper trunnion and a lower trunnion; a steering spindle journalled on said trunnions; an upper cap detachably secured to the upper part of said spindle and having a thrust plate cooperating in abutting engagement with the end of said upper trunnion; and a lower cap detachably secured to the lower portion of said spindle and cooperating in direct thrust-transmitting engagement with the end of said lower trunnion.

6. The steer drive axle construction defined in claim 5, wherein said upper and lower trunnions have a total axial play between said thrust plate and said lower cap respectively of from two to ten thousandths of an inch.

HERBERT W. ALDEN.